United States Patent
Kim et al.

(10) Patent No.: US 8,940,456 B2
(45) Date of Patent: Jan. 27, 2015

(54) FUEL CELL AND MANUFACTURING METHOD OF THE SAME

(75) Inventors: Jan-Dee Kim, Yongin-si (KR); Jun-Won Suh, Yongin-si (KR); Young-Sun Kwon, Yongin-si (KR); Ho-Jin Kweon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 510 days.

(21) Appl. No.: 13/199,780

(22) Filed: Sep. 9, 2011

(65) Prior Publication Data

US 2012/0129080 A1    May 24, 2012

(30) Foreign Application Priority Data

Nov. 19, 2010  (KR) .......................... 10-2010-0115561

(51) Int. Cl.
*H01M 2/08* (2006.01)
*H01M 8/02* (2006.01)

(52) U.S. Cl.
CPC ............ *H01M 8/0208* (2013.01); *H01M 8/028* (2013.01); *H01M 8/0289* (2013.01); *Y02E 60/50* (2013.01); *Y02E 60/523* (2013.01)
USPC ............................. 429/508; 429/466; 429/469

(58) Field of Classification Search
CPC .............. H01M 8/2425; H01M 8/243; H01M 2008/1293
USPC .......................................... 429/508, 466, 469
See application file for complete search history.

(56) References Cited

U.S. PATENT DOCUMENTS 7,566,510 B2    7/2009  Song et al.

FOREIGN PATENT DOCUMENTS

| JP | 2601911 B2 | 1/1997 |
| JP | 10-284093 | 10/1998 |
| JP | 2002-367632 A | 12/2002 |
| JP | 2004-146131 | 5/2004 |
| JP | 2004-178853 | 6/2004 |
| KR | 10-0681007 B1 | 2/2007 |

OTHER PUBLICATIONS

KIPO Office Action dated Jun. 1, 2012 for KR 10-2010-0115561 (1 page).
Patent Abstracts of Japan Pub. No. 03-034258 dated Feb. 14, 1991 for JP 2601911 B2 (1 page).

*Primary Examiner* — Jane Rhee
(74) *Attorney, Agent, or Firm* — Christie, Parker & Hale, LLP

(57) ABSTRACT

A manufactured fuel cell includes: a unit cell including a first electrode layer, an electrolyte layer surrounding an outer circumference of the first electrode layer, and a second electrode layer surrounding the electrolyte layer while exposing an end of the electrolyte layer; a plating layer around an outer circumference of the exposed electrolyte layer; a cell coupling member including a passage pipe inserted into the unit cell and forming a continuous passage from the inside of the unit cell, a coupling pipe provided outside of the passage pipe to form a space accommodating an end of the unit cell from the passage pipe, and a connecting unit connecting the coupling pipe with the passage pipe and restricting an insertion depth of the electrolyte layer and the first electrode layer; and a welding portion fixing and sealing the plating layer and an inner circumference of the coupling pipe with each other.

20 Claims, 10 Drawing Sheets
(1 of 10 Drawing Sheet(s) Filed in Color)

FUEL CELL AND MANUFACTURING METHOD OF THE SAME

CROSS-REFERENCE TO RELATED APPLICATION

This application claims priority to and the benefit of Korean Patent Application No. 10-2010-0115561, filed on Nov. 19, 2010, in the Korean Intellectual Property Office, the entire content of which is incorporated herein by reference.

BACKGROUND

1. Field

The following description relates to a fuel cell and a method of manufacturing the same, and more particularly, to a fuel cell in which a cell coupling member and a unit cell are effectively brazed and a method of manufacturing the same.

2. Description of Related Art

A fuel cell is a high efficiency clean power generating technology for directly converting hydrogen contained in hydrocarbon material such as natural gas, coal gas, methanol, etc. and oxygen in air into electric energy by an electrochemical reaction. Fuel cells may be roughly classified into an alkaline fuel cell, a phosphoric acid fuel cell, a molten carbonate fuel cell, a solid oxide fuel cell, and a polymer electrolyte membrane fuel cell according to the type of electrolyte.

Among them, the solid oxide fuel cell runs at high temperature from about 600 degrees Celsius to 1,000 degrees Celsius, and is widely used because its position control of the electrolyte is relatively easy compared to other existing fuel cells, its fuel is not in danger of running out, and its material of formation has a long life span.

Since the inside and the outside of the fuel cell in the solid oxide fuel cell are different electrodes, different fuels are supplied thereto. In this case, when a sealed portion leaks due to inferior sealing between a unit cell and a cell coupling member, the fuels of the inside and the outside are mixed at high temperature and the mixed fuel increases temperature sharply. The resulting high temperature accelerates deterioration of the unit cell and durability of the fuel cell can be reduced.

SUMMARY

Aspects of embodiments of the present invention are directed toward a fuel cell in which a cell coupling member and a unit cell are effectively brazed and a method of manufacturing the same.

In order to achieve the foregoing and/or other aspects of the present invention, there is provided a fuel cell including: a unit cell that includes a first electrode layer, an electrolyte layer surrounding an outer circumference of the first electrode layer, and a second electrode layer surrounding the electrolyte layer while exposing an end of the electrolyte layer; a plating layer formed around an outer circumference of the exposed electrolyte layer; a cell coupling member including a passage pipe configured to be inserted into the unit cell and to form a continuous passage from the inside of the unit cell, a coupling pipe provided outside of the passage pipe to form a space configured to accommodate an end of the unit cell from the passage pipe, and a connecting unit configured to connect the coupling pipe with the passage pipe and restrict an insertion depth of the electrolyte layer and the first electrode layer; and a welding portion configured to fix and seal the plating layer and an inner circumference of the coupling pipe with each other.

In one embodiment, the plating layer may be an electroless plated layer.

The plating layer may contain nickel (Ni).

The plating layer may further contain phosphorus (P) and/or boron (B).

In this case, the plating layer may contain an amount of phosphorus (P) at 5 wt % or 10 wt % or between 5 wt % and 10 wt % with respect to total weight of the plating layer.

The plating layer may contain an amount of boron (B) greater than 0 wt % and equal to or less than 5 wt % with respect to total weight of the plating layer.

The plating layer may extend over the lower end of the unit cell.

Moreover, the plating layer may extend to an inner circumference of the unit cell.

The fuel cell may further include an electrolyte layer between the unit cell and the plating layer.

In order to achieve another aspect of the present invention, there is provided a method of manufacturing a fuel cell, the method including: manufacturing a unit cell including a first electrode layer, an electrolyte layer surrounding an outer circumference of the first electrode layer, and a second electrode layer surrounding the electrolyte layer while exposing an end of the electrolyte layer; forming a plating layer on an outer circumference of the exposed electrolyte layer; manufacturing a cell coupling member including a passage pipe configured to be inserted into the unit cell and form a continuous passage from an inside of the unit cell, a coupling pipe provided outside of the passage pipe to form a space configured to accommodate an end of the unit cell from the passage pipe, and a connecting unit configured to connect the coupling pipe with the passage pipe and restrict an insertion depth of the electrolyte layer and the first electrode layer; and forming a welding portion configured to fix and seal the plating layer and an inner circumference of the coupling pipe with each other.

Here, the plating layer may be formed by electroless plating.

The method may further include forming a plating seed layer on the outer circumference of the exposed electrolyte layer, before forming the plating layer.

In this case, the plating seed layer may be formed by immersion plating.

The plating layer may contain nickel (Ni).

The plating layer may further contain phosphorus (P) and/or boron (B).

The plating layer may contain an amount of phosphorus (P) at 5 wt % or 10 wt % or between 5 wt % and 10 wt % with respect to total weight of the plating layer.

The plating layer may contain an amount of boron (B) greater than 0 wt % and equal to or less than 5 wt % with respect to total weight of the plating layer.

The plating layer may extend over the lower end of the unit cell.

The plating layer may extend to an inner circumference of the unit cell.

The method may further including an electrolyte layer between the unit cell and the plating layer.

According to the present invention, a fuel cell in which a cell coupling member and a fuel cell are effectively brazed and a method of manufacturing the same may be provided.

In addition, a coupling force between a unit cell and a cell coupling member is improved so that so that inferior life span of the fuel cell can be reduced.

BRIEF DESCRIPTION OF THE DRAWINGS

The patent or application file contains at least one drawing executed in color. Copies of this patent application publication with color drawing(s) will be provided by the Office upon request and payment of the necessary fee.

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

Since the present invention may be modified in various ways and have various embodiments, the present invention will be described in detail with reference to the drawings. However, it should be understood that the present invention is not limited to a specific embodiment but includes all changes and equivalent arrangements and substitutions included in the spirit and scope of the present invention. In the following description of the present invention, if the detailed description of the already known structure and operation may confuse the subject matter of the present invention, the detailed description thereof will be omitted.

Throughout this specification, same reference numerals are assigned to same elements. Although an anode support type fuel cell will be described in the embodiments of the present invention, the present invention is not limited to the anode support type fuel cell and may be applied to a cathode support type fuel cell. In addition, the term "cell coupling member" indicates a "cell cap" or a "cell connector."

Hereinafter, the embodiments of the present invention will be described with reference to the accompanying drawings.

Hereinafter, a fuel cell according to a first embodiment of the present invention will be described with reference to FIGS. 1 to 2B.

Figure 1:
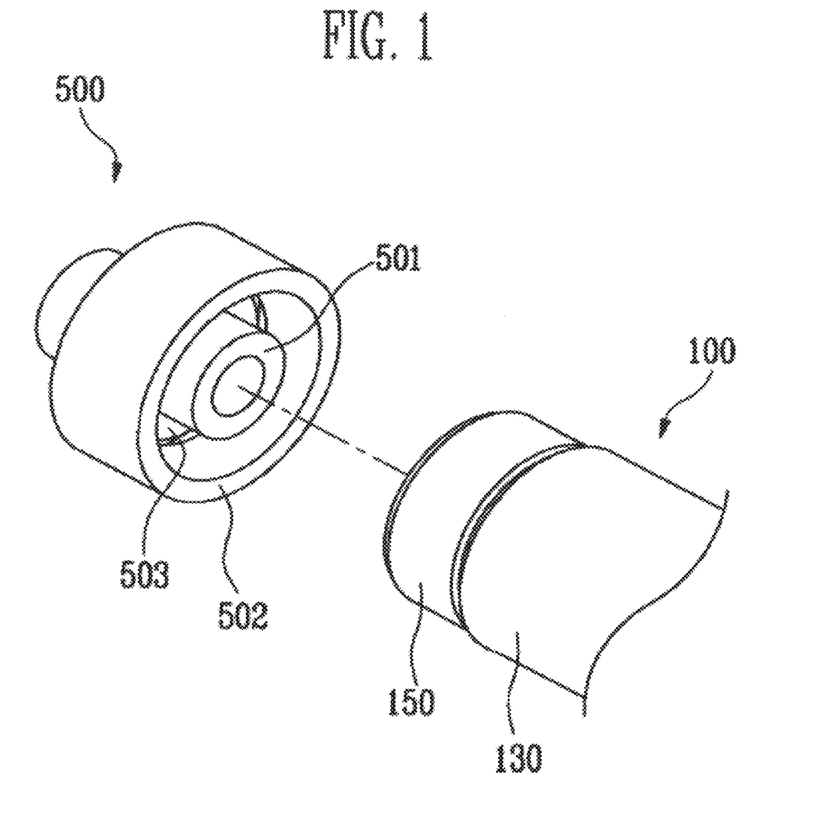
FIG. 1 is a perspective view illustrating a unit cell and a cell coupling member according to a first embodiment of the present invention.
Figure 2A:
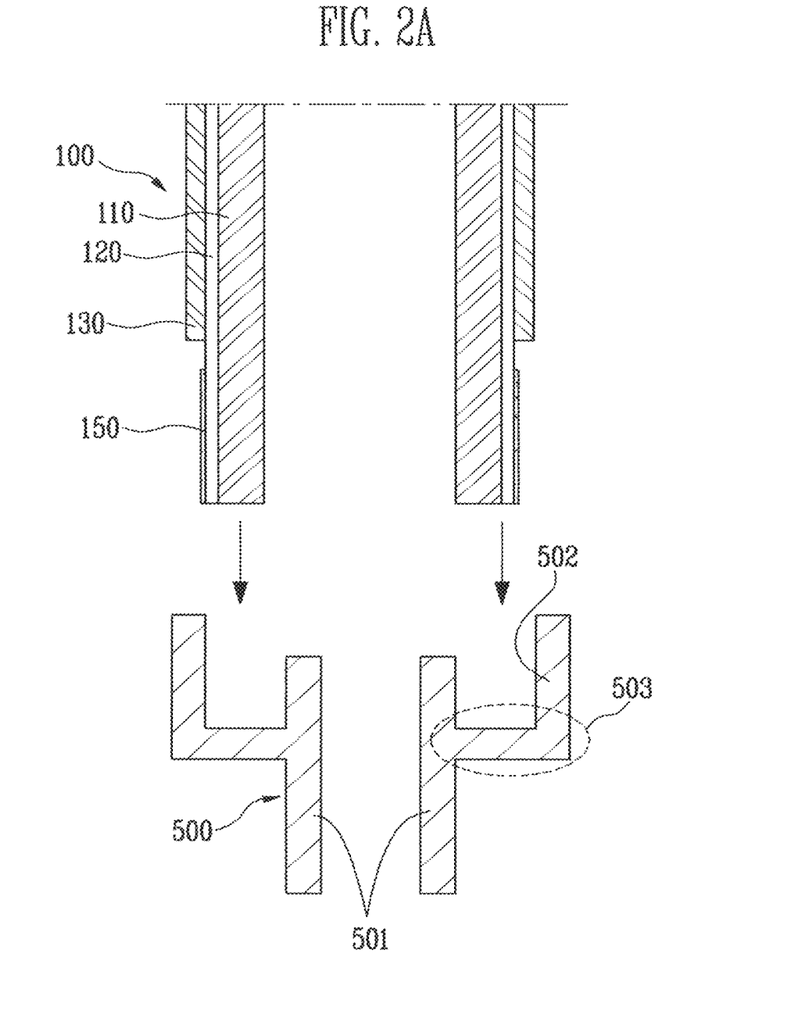
FIG. 2A is a sectional view illustrating the unit cell and the cell coupling member according to the first embodiment of the present invention.
Figure 2B:
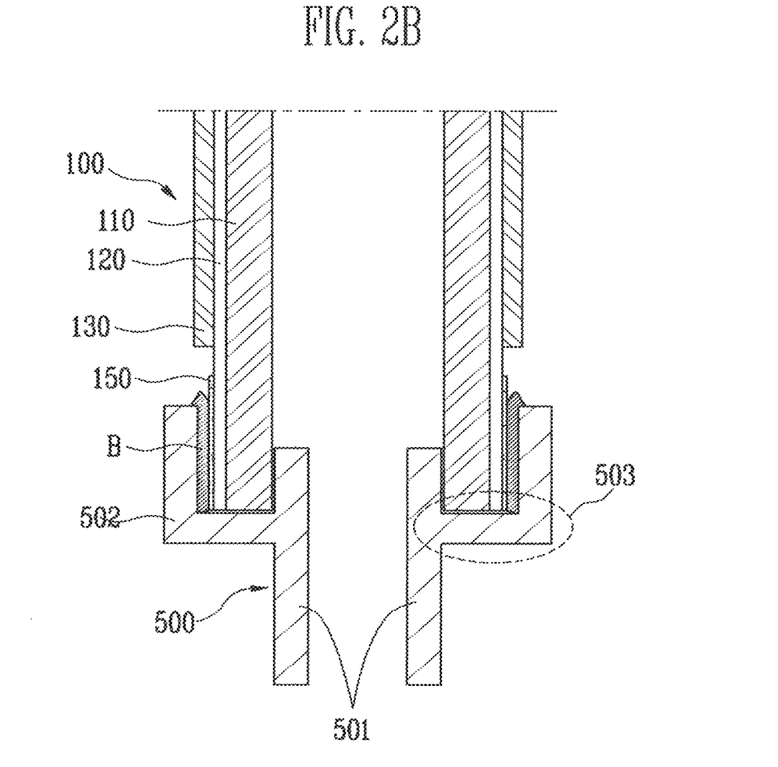
FIG. 2B is a sectional view illustrating the coupling between the unit cell and the cell coupling member according to the first embodiment of the present invention.

FIG. 1 is a perspective view illustrating a unit cell and a cell coupling member according to a first embodiment of the present invention. FIG. 2A is a sectional view illustrating the unit cell and the cell coupling member according to the first embodiment of the present invention. FIG. 2B is a sectional view illustrating the coupling between the unit cell and the cell coupling member according to the first embodiment of the present invention.

A fuel cell according to the first embodiment of the present invention includes a unit cell 100, a cell coupling member 500, a plating layer 150, and a welding portion B.

The unit cell 100 has a hollow cylinder shape. The unit cell 100 includes a first electrode layer 110, an electrolyte layer 120, and a second electrode layer 130 laminated from the inside to the outside. Here, the electrolyte layer 120 is formed to surround an outer circumference of the first electrode layer 110, and the second electrode layer 130 is formed to surround the electrolyte layer 120 while exposing an end of the electrolyte layer 120. The first electrode layer 110 may be an anode or a cathode according to a type of a fuel cell, and alternately the second electrode layer 130 may be a cathode or an anode according to the type of a fuel cell. In the embodiments of the present invention, the first electrode layer 110 is an anode, and the second electrode layer 130 is a cathode.

Ni-YSZ cermet, which is low in cost and stable in high temperature reduction mood, which has a similar thermal expansion coefficient as that of YSZ, and which has excellent catalyst characteristics, can be used as the first electrode layer 110 (i.e., as the anode). YSZ-based ceramic can be used as the second electrode 130 (i.e., as the cathode in this case) when the second electrode 130 is utilized at 800 degrees Celsius to 1,000 degrees Celsius.

Electrolyte materials such as $Sc_2O_3$-stabilized $ZrO_2$ (ScSZ) with excellent conductivity, $CeO_2$ (doped $CeO_2$) with added rare earth elements, (La, Sr) (Ga, Mg)$O_3$ (LSGM), and yttria-stabilized zirconia (YSZ) may be used as the electrolyte layer 120. The YSZ among the above-listed materials is the most used material because of chemical stable electrolyte characteristic under wide oxygen partial pressure, of excellent mechanical property, and of low cost price in spite of its low ion conductivity.

As described above, the electrolyte layer 120 is formed to surround the outer circumference of the first electrode layer 110, and the second electrode layer 130 is formed to surround the electrolyte layer 120 while exposing an end of the electrolyte layer 120. A plating layer 150 is formed around the outer circumference of the exposed electrolyte layer 120. Here, the plating layer 150 is formed by electroless plating.

The plating layer 150 is mainly made of nickel (Ni) and further includes at least any one of $NaH_2PO_2 \cdot H_2O$ as a reductant used in the electroless plating, $NaBH_4$, and phosphorus (P) and boron (B) that are derived from demethaylamine boride (DMAB). Here, the amount of phosphorus (P) may be equal to or greater than 5 wt % and equal to or less than 10 wt % of total weight of the plating layer 150, and the amount of boron (B) may be greater than 0 wt % and equal to or less than 5 wt % of total weight of the plating layer 150.

When content of phosphors (P) or boron (B) is increased, tensile stress is decreased and the plating layer 150 is not easily separated but conductivity drops down. When content of phosphorus (P) or boron (B) is increased, density of the plating layer 150 is lowered. That is, when content of phosphorus (P) or boron (B) is lowered, a plating layer 150 with high density is formed. Therefore, phosphorus (P) or boron (B) may be contained in the plating layer 150 as much as above-described content by considering the tensile stress, density, and conductivity. Meanwhile, any one selected from a group consisting of acetic acid as an organic acid, glycolic acid, citric acid, alkali salt of tartaric acid, thioglycolic acid, ammonia, hydrazine, triethanolamine, ethylenediamine, glycine, O-aminophenol, and pyridine may be used as a complexing agent in the non-electroless plating, but the complexing agent is not limited thereto.

The cell coupling member 500 is an element to prevent hydrogen gas and external air, which are supplied to the inside and the outside of the unit cell 100, respectively, from being mixed with each other, and includes a passage pipe 501, a connecting unit 503, and a coupling pipe 502. An end of the passage pipe 501 is inserted into the unit cell 100 through a lower opening of the unit cell 100. The passage pipe 501 communicates with the internal space of the unit cell 100 to form a continuous passage serving to deliver fuel or air to other elements. The coupling pipe 502 is formed at the outside of the passage pipe 501 to have a diameter greater than that of the passage pipe 501 and forms a space defined against the passage pipe 501 and accommodating an end of the unit cell 100. The connecting unit 503 connects the coupling pipe 502 with the passage pipe 501. The connecting unit 503 supports the coupling pipe 502 and restricts the insertion depth when the unit cell 100 is inserted. Meanwhile, the above-mentioned passage pipe 501, connecting unit 503, and coupling pipe 502 may be integrated with each other (e.g., as one integral body) for sealing and durability.

The welding portion B fixes and seals the plating layer 150 with an inner circumference of the coupling pipe 502.

In a comparable solid oxide fuel cell, the outer end circumference of a unit cell and the inner circumference of a cell coupling member are brazed. However, since the unit cell is made of ceramic such as YSZ and the cell coupling member is made of metal, the brazing process of the fuel cell using filler metal may be very difficult due to different properties of the materials. Since wettability of filler metal and a unit cell consisting of $BNi_2$ on YSZ is not good, sealing between the unit cell and the cell coupling member becomes inferior. This can contribute to the life span deterioration of the fuel cell.

However, in the first embodiment of the present invention, the plating layer 150 of metal is formed on the outer circumference of the exposed electrolyte layer 120 to improve wettability of the welding portion B composed of filler metal so that a fixing force may be further increased during the brazing process.

Hereinafter, a fuel cell according to a second embodiment of the present invention will be described with reference to FIGS. 3A and 3B. In the second embodiment of the present invention, elements and operations that are duplicative of the first embodiment of the present invention will be omitted, and elements and operations different from the first embodiment will be highlighted.

Figure 3A:
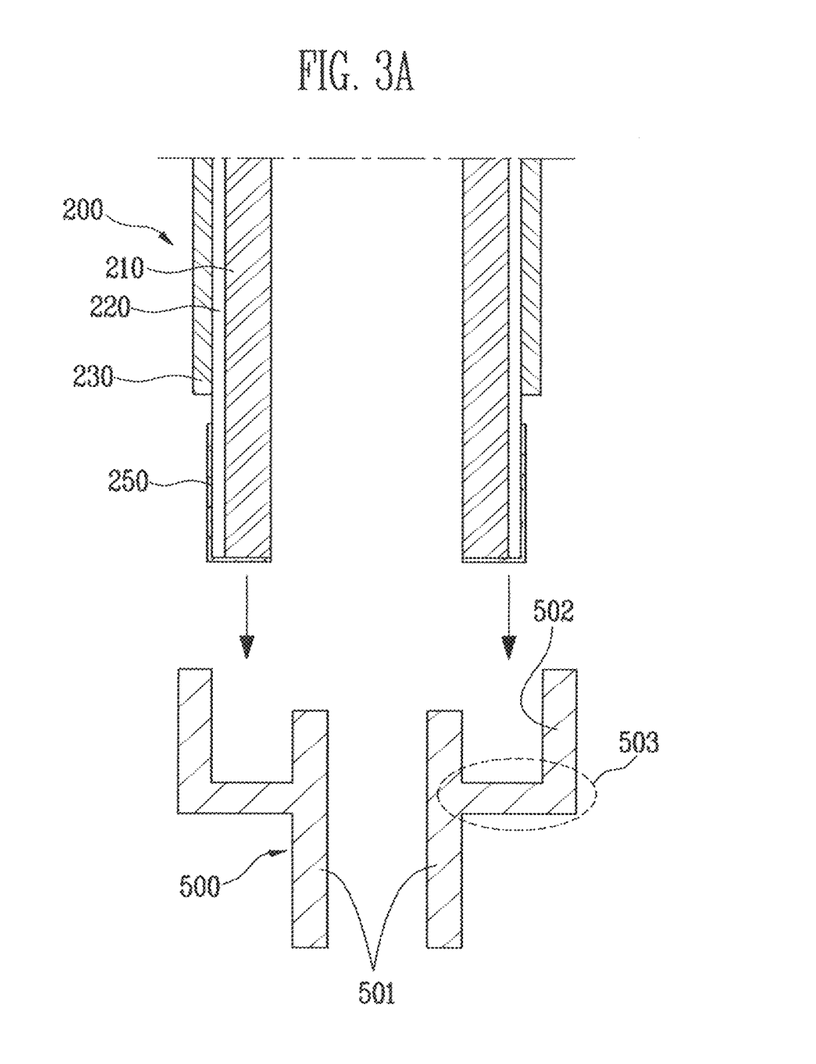
FIG. 3A is a sectional view illustrating a unit cell and a cell coupling member according to a second embodiment of the present invention.
Figure 3B:
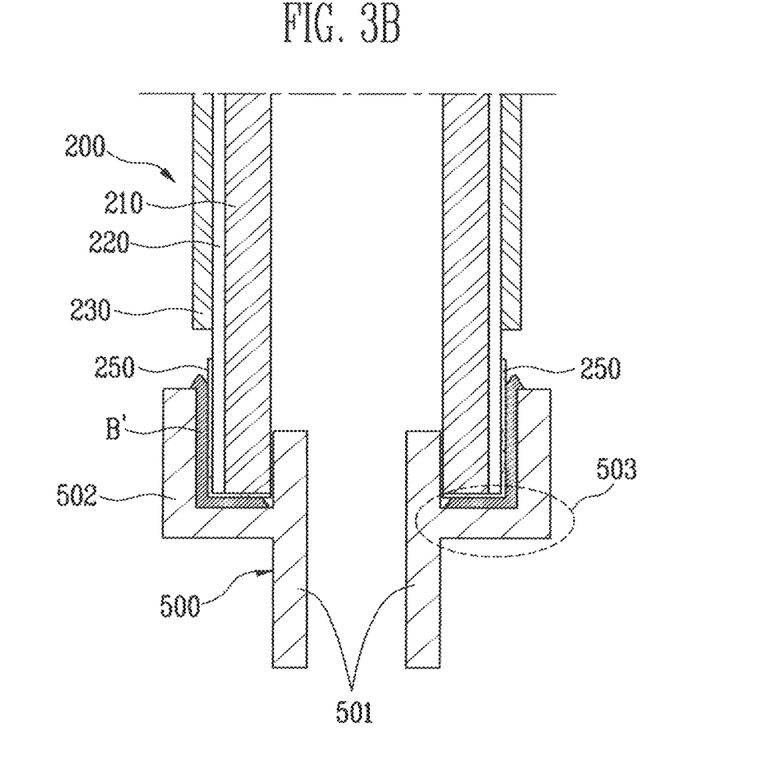
FIG. 3B is a sectional view illustrating the coupling between the unit cell and the cell coupling member according to the second embodiment of the present invention.

FIG. 3A is a sectional view illustrating a unit cell and a cell coupling member according to a second embodiment of the present invention. FIG. 3B is a sectional view illustrating the coupling between the unit cell and the cell coupling member according to the second embodiment of the present invention.

A fuel cell according to the second embodiment of the present invention includes a unit cell 200, a cell coupling member 500, a plating layer 250, and a welding portion B'.

The unit cell 200 has a hollow cylindrical shape. The unit cell 200 includes a first electrode layer 210, an electrolyte layer 220, and a second electrode layer 230 laminated from the inside to the outside. Here, the electrolyte layer 220 is formed to surround an outer circumference of the first electrode layer 210, and the second electrode layer 230 is formed to surround the electrolyte layer 220 while exposing an end of the electrolyte layer 220.

As described above, the electrolyte layer 220 is formed to surround the outer circumference of the first electrode layer 210, and the second electrode layer 230 is formed to surround the electrolyte layer 220 while exposing an end of the electrolyte layer 220. The plating layer 250 is formed around an outer circumference of the exposed electrolyte layer 220 and on the lower end of the unit cell 200. Here, the plating layer 250 is formed by electroless plating. The plating layer 250 is mainly made of nickel (Ni) and further includes at least any one of $NaH_2PO_2 \cdot H_2O$ as a reductant used in the electroless plating, $NaBH_4$, and phosphorus (P) and boron (B) that are derived from demethaylamine boride (DMAB). Here, the amount of phosphorus (P) may be equal to or greater than 5 wt % and equal to or less than 10 wt % of total weight of the plating layer 250 and the amount of boron (B) may be greater than 0 wt % and equal to or less than 5 wt % of total weight of the plating layer 250. The range of content is chosen for the reasons as described above. Meanwhile, any one selected from a group consisting of acetic acid as an organic acid, glycolic acid, citric acid, alkali salt of tartaric acid, thioglycolic acid, ammonia, hydrazine, triethanolamine, ethylenediamine, glycine, O-aminophenol, and pyridine may be used as a complexing agent in the non-electroless plating similar to the first embodiment, but the complexing agent is not limited thereto.

Unlike in the first embodiment, the plating layer 250 according to the second embodiment of the present invention extends to the lower end of the unit cell 200.

The welding portion B' fixes and seals up the plating layer 250 extended to the lower end of the unit cell 200 and the inner circumference of the coupling pipe 502.

Here, in the second embodiment of the present invention, the plating layer 250 of metal is formed on the outer circumference of the exposed electrolyte layer 220 to improve wettability of the welding portion B' composed of filler metal so that a fixing force may be further increased during the brazing process.

Hereinafter, a fuel cell according to a third embodiment of the present invention will be described with reference to FIGS. 4A and 4B. In the third embodiment of the present invention, elements and operations that are duplicative of the first embodiment and the second embodiment of the present invention will be omitted, and elements and operations different from the first embodiment and the second embodiment will be highlighted.

Figure 4A:
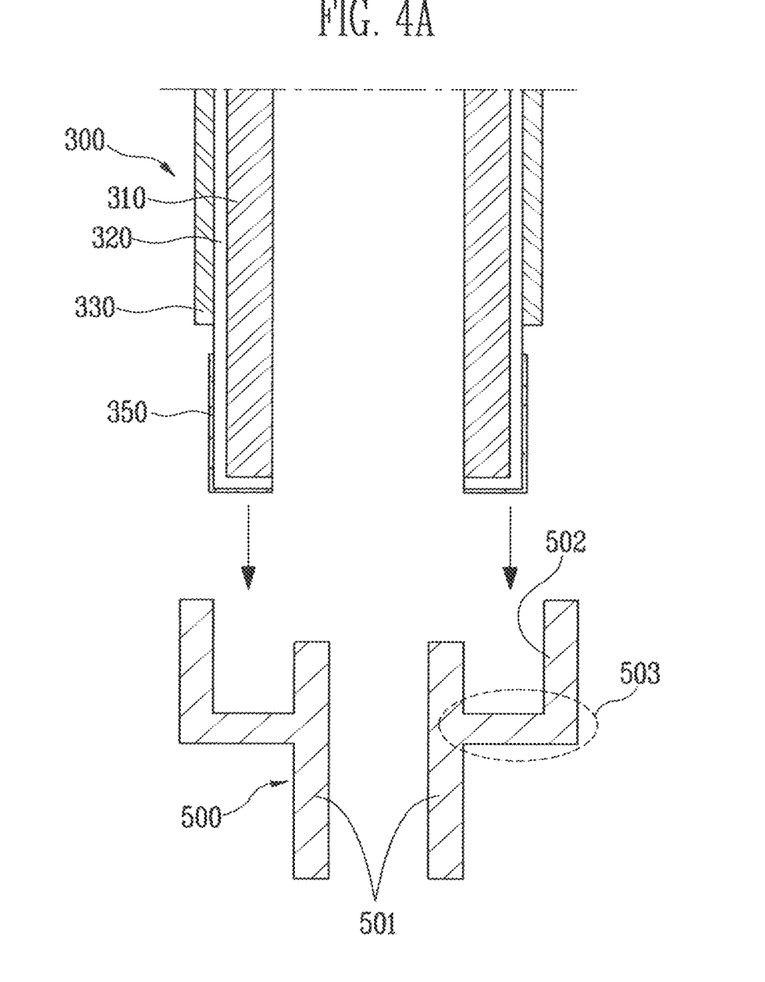
FIG. 4A is a sectional view illustrating a unit cell and a cell coupling member according to a third embodiment of the present invention.
Figure 4B:
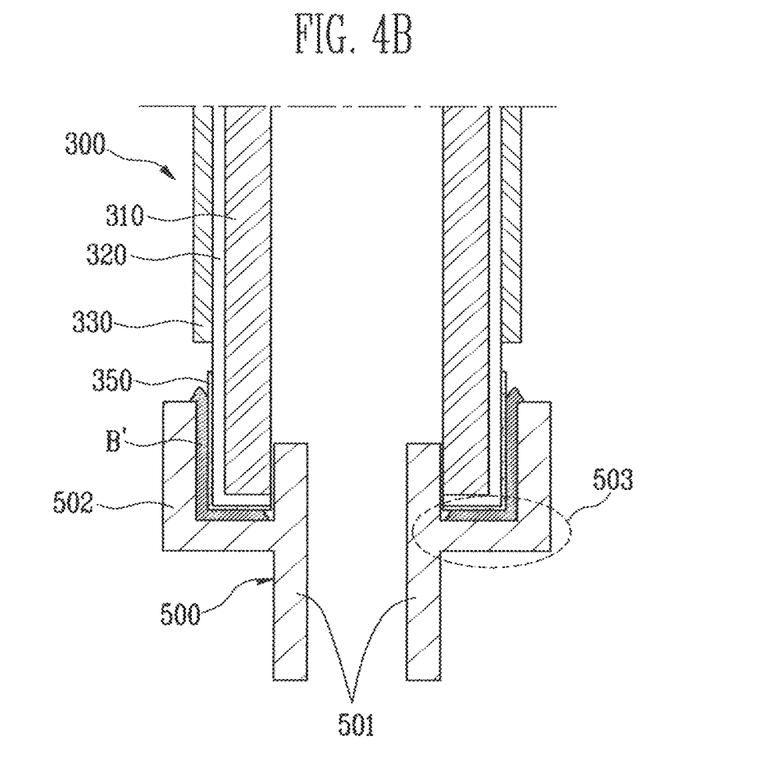
FIG. 4B is a sectional view illustrating the coupling between the unit cell and the cell coupling member according to the third embodiment of the present invention.

FIG. 4A is a sectional view illustrating a unit cell and a cell coupling member according to a third embodiment of the present invention. FIG. 4B is a sectional view illustrating the coupling between the unit cell and the cell coupling member according to the third embodiment of the present invention.

A fuel cell according to the third embodiment of the present invention includes a unit cell 300, a cell coupling member 500, a plating layer 350, and a welding portion B'.

The unit cell 300 has a hollow cylinder shape. The unit cell 300 includes a first electrode layer 310, an electrolyte layer 320, and a second electrode layer 330 laminated from the inside to the outside. Here, the electrolyte layer 320 is formed to surround an outer circumference of the first electrode layer 310, and the second electrode layer 330 is formed to surround the electrolyte layer 320 while exposing an end of the electrolyte layer 320.

As described above, the electrolyte layer 320 is formed to surround the outer circumference of the first electrode layer 310, and the second electrode layer 330 is formed to surround the electrolyte layer 320 while exposing an end of the electrolyte layer 320. The plating layer 350 is formed around an outer circumference of the exposed electrolyte layer 320 and on the exposed lower end of the unit cell 300. Here, the electrolyte layer 320 according to the third embodiment of the present invention extends between the first electrode layer 310 and the plating layer 350, including the lower end of the unit cell 300. In this case, the electrolyte layer 320 is formed to increase a coupling force between the first electrode layer 310 and the plating layer 350. The plating layer 350 is formed by electroless plating. The plating layer 350 is mainly made of nickel (Ni) and further includes at least any one of $NaH_2PO_2.H_2O$ as a reductant used in the electroless plating, $NaBH_4$, and phosphorus (P) and boron (B) that are derived from demethaylamine boride (DMAB). Here, the amount of phosphorus (P) may be equal to or greater than 5 wt % and equal to or less than 10 wt % of total weight of the plating layer 350 and the amount of boron (B) may be greater than 0 wt % and equal to or less than 5 wt % of total weight of the plating layer 350. The range of content is chosen for the reasons as described above. Meanwhile, like in the first and second embodiments of the present invention, any one selected from a group consisting of acetic acid as an organic acid, glycolic acid, citric acid, alkali salt of tartaric acid, thioglycolic acid, ammonia, hydrazine, triethanolamine, ethylenediamine, glycine, O-aminophenol, and pyridine may be used as a complexing agent in the non-electroless plating like in the first embodiment, but the complexing agent is not limited thereto.

The plating layer 350 according to the third embodiment of the present invention extends to the lower end of the unit cell 300 unlike in the first embodiment, and the electrolyte layer 320 extends between the first electrode layer 310 and the plating layer 350, including the lower end of the unit cell 300, so as to increase a coupling force between the first electrode layer 310 and the plating layer 350 unlike in the first embodiment and the second embodiment of the present invention.

The welding portion B' fixes and seals up the plating layer 350 extending to the lower end of the unit cell 300 and the inner circumference of the coupling pipe 502.

Here, in the third embodiment of the present invention, the plating layer 350 of metal is formed on the outer circumference of the exposed electrolyte layer 320 and on the lower end of the unit cell 300, and the electrolyte layer 320 extends between the first electrode layer 310 and the plating layer 350 to improve wettability of the welding portion B' composed of filler metal so that a fixing force may be further increased during the brazing process.

Hereinafter, a fuel cell according to a fourth embodiment of the present invention will be described with reference to FIGS. 5A and 5B. In the fourth embodiment of the present invention, elements and operations that are duplicative of the first to third embodiments of the present invention will be omitted, and elements and operations different from the first to third embodiments will be highlighted.

Figure 5A:
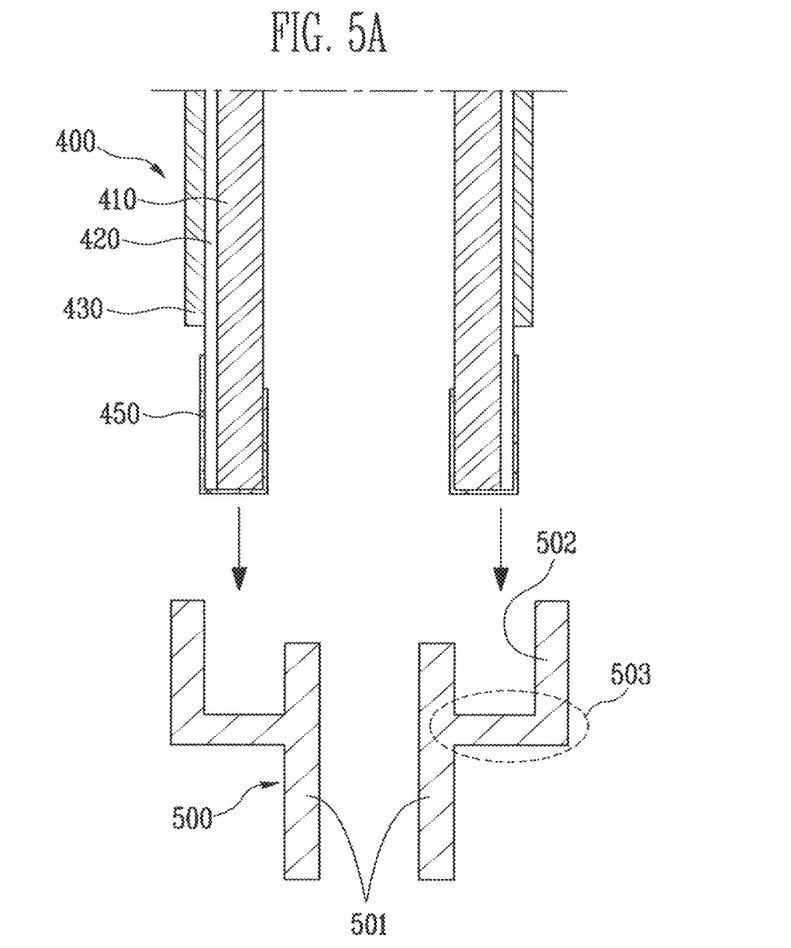
FIG. 5A is a sectional view illustrating a unit cell and a cell coupling member according to a fourth embodiment of the present invention.
Figure 5B:
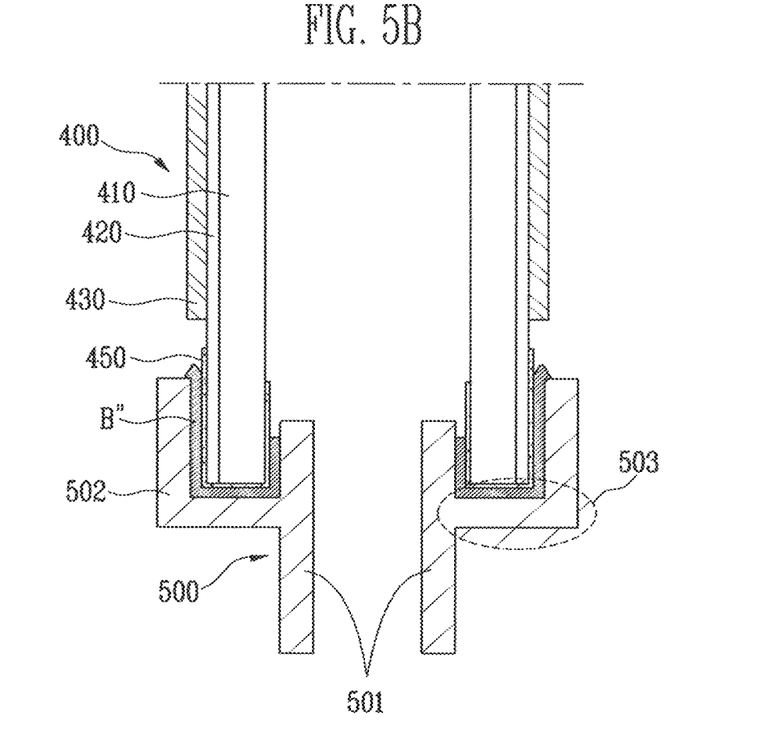
FIG. 5B is a sectional view illustrating the coupling between the unit cell and the cell coupling member according to the fourth embodiment of the present invention.

FIG. 5A is a sectional view illustrating a unit cell and a cell coupling member according to a fourth embodiment of the present invention. FIG. 5B is a sectional view illustrating the coupling between the unit cell and the cell coupling member according to the fourth embodiment of the present invention.

A fuel cell according to the fourth embodiment of the present invention includes a unit cell 400, a cell coupling member 500, a plating layer 450, and a welding portion B".

The unit cell 400 has a hollow cylinder shape. The unit cell 400 includes a first electrode layer 410, an electrolyte layer 420, and a second electrode layer 430 laminated from the inside to the outside. Here, the electrolyte layer 420 is formed to surround an outer circumference of the first electrode layer 410, and the second electrode layer 430 is formed to surround the electrolyte layer 420 while exposing an end of the electrolyte layer 420.

As described above, the electrolyte layer 420 is formed to surround the outer circumference of the first electrode layer 410, and the second electrode layer 430 is formed to surround the electrolyte layer 420 while exposing an end of the electrolyte layer 420. The plating layer 450 is formed around an outer circumference of the exposed electrolyte layer 420, on the lower end, and on an inner circumference of the unit cell 400. Here, the plating layer 450 is formed by electroless plating. The plating layer 450 is mainly made of nickel (Ni) and further includes at least any one of $NaH_2PO_2.H_2O$ as a reductant used in the electroless plating, $NaBH_4$, and phosphorus (P) and boron (B) that are derived from demethaylamine boride (DMAB). Here, amount of phosphorus (P) may be equal to or greater than 5 wt % and equal to or less than 10 wt % of total weight of the plating layer 450 and the amount of boron (B) may be greater than 0 wt % and equal to or less than 5 wt % of total weight of the plating layer 450. The range of content is chosen for the reasons as described above. Meanwhile, any one selected from a group consisting of acetic acid as an organic acid, glycolic acid, citric acid, alkali salt of tartaric acid, thioglycolic acid, ammonia, hydrazine, triethanolamine, ethylenediamine, glycine, O-aminophenol, and pyridine may be used as a complexing agent in the non-electroless plating like in the first embodiment, but the complexing agent is not limited thereto.

The plating layer 450 according to the fourth embodiment of the present invention extends to the lower end and the inner circumference of the unit cell 400 unlike in the first to third embodiments.

The welding portion B" fixes and seals up the plating layer 450 extending to the lower end and the inner circumference of the unit cell 400 and the inner circumference of the coupling pipe 502. The plating layer 450 according to the fourth embodiment of the present invention may extend to the lower end of the unit cell 400 between the first electrode layer 410 and the plating layer 450 in the same form as that of the plating layer 350 of the third embodiment of the present invention.

Like in the fourth embodiment of the present invention, the plating layer 450 of metal is formed on the outer circumference of the exposed electrolyte layer 420 and on the lower end and the inner circumference of the unit cell 400 to improve wettability of the welding portion B" composed of filler metal so that a fixing force may be further increased during the brazing process.

Figure 6A:
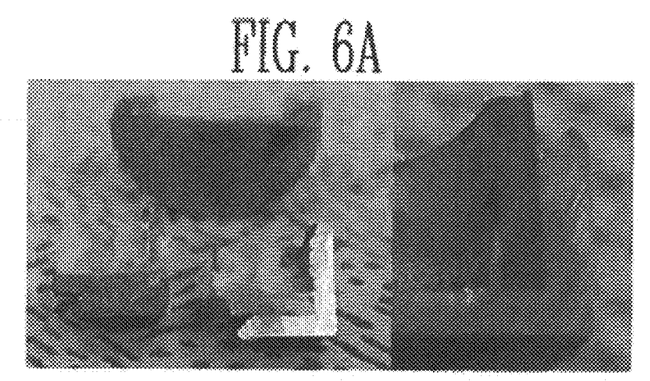
FIG. 6A is a photograph illustrating cutting sections of the unit cell and the cell coupling member according to an embodiment of the present invention.
Figure 6B:
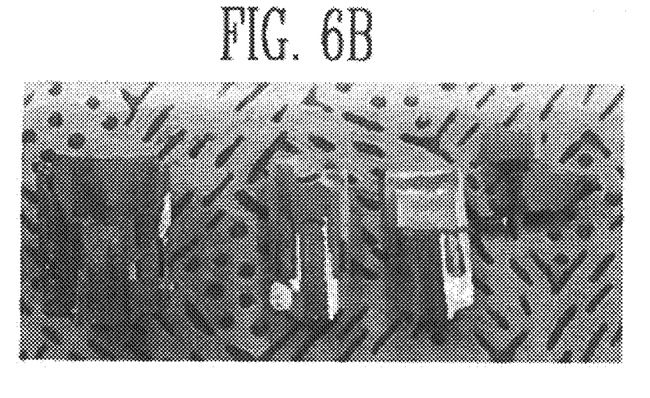
FIG. 6B a photograph illustrating cutting sections of a unit cell and a cell coupling member according to a comparative example of the present invention.

Hereinafter, the comparing results of cutting sections of unit cell and cell coupling members according to an embodiment of the present invention and a comparative example and with performance improvement thereof will be described with reference to Table 1 and FIGS. 6A and 6B.

Embodiment

In the embodiment of the present invention, an anode support is employed.

A powder of rare-earth oxides (for example, $Y_2O_3$) excluding La, Ce, Pr, and Nd is mixed with a powder of Ni and/or NiO to form a mixed powder. A mixture made by mixing an organic binder and a solvent with the mixed powder is extruded to form a support body. The extruded support body is dried and sintered at 1,250 degrees Celsius.

Next, oxide powder containing a powder of Ni and/or NiO and rare-earth elements such as $Y_2O_3$—$ZrO_2$ is mixed with an organic binder and a solvent to form a slurry, and an anode function layer is coated on the support body using the manufactured slurry.

After that, an electrolyte layer is coated on the support body coated with the function layer using the manufactured slurry by mixing the oxide powder containing rare-earth elements such as $Y_2O_3$—$ZrO_2$ with an organic binder and a solvent, and the support body coated with the electrolyte layer is simultaneously (or concurrently) sintered under the oxygen containing mood at 1,300 degrees Celsius to 1,600 degrees Celsius.

Next, a paste is made by mixing a powder of transition metal Perovskite oxide with a solvent and is coated on a solid electrolyte, and is annealed at 1,000 degrees Celsius to 1,300 degrees Celsius so that a fuel cell according to the present invention may be manufactured.

An end of a cell to be coupled with a fuel supply is processed to have a rough surface by sand blast. The rough portion of the cell is put into a $SnCl_2$ solution and a $PdCl_2$ solution alternately to form a plating seed layer.

The plating seed layer is formed by the following process. The first step includes dipping the rough cell portion into a thin-diluted hydrochloric acid aqueous solution in which stannous chloride is dissolved under normal temperature, washing the rough cell portion with distilled water, then dipping the rough cell portion into a thin-diluted hydrochloride acid aqueous solution in which palladium chloride is dissolved under normal temperature, and then washing the rough cell portion with distilled water. This process is repeated several times and electroless plating is carried out. A cell formed with a seed layer is dipped into a plating bath, a set or predetermined pH of which has been adjusted by dissolving a Ni salt, sodium phypophosphite ($NaH_2PO_2.H_2O$), as a reductant, and ammonia as a complexing agent. After that, the cell is washed with distilled water to form the electroless plating layer.

Next, a filler metal is formed between parts of the fuel supply and the electroless plated coupling pipe, and is brazed to connect the cell to the fuel supply.

In order to determine whether the cell was connected to the fuel supply without leak, a snoop test and a He leak test were carried out against the connecting portion between the cell and the fuel supply, the sections have been observed, and the results are listed in the following Table 1.

As listed in Table 1, the He leak test has a satisfactory result of $<6.3\times10^{-9}$ atm·L/sec. As a result of the snoop test, it is confirmed, as shown in the photograph illustrating the connecting portion in FIG. 6A, that the coupling pipe is adjoined well with the unit cell due to improved interface adhesion when the connected portion is cut for the observation.

Comparative Example

A unit cell in which the electroless plating layer is not formed in the above embodiment becomes a comparative example, and the rest of this comparative example is identical to the above embodiment excluding the electroless plating layer. Identically to the above embodiment, in order to check whether the cell and the fuel supply were formed without leak, the snoop test and the He leak test of the connecting portion between the cell and the fuel supply were carried out, sections thereof have been observed, and the test results are listed in the following Table 1.

As listed in Table 1, the He leak test was over the measurable range and could not measured. The snoop test revealed that the coupling pipe and the unit cell were separated from each other when the connected portion is cut, as shown in the photograph of the connecting portion in FIG. 6B.

TABLE 1

|  | Condition | Filler metal | Snoop test | He leak test (atm · L/sec) |
|---|---|---|---|---|
| Embodiment | Forming Ni electroless plating layer | BNi | OK | $<6.3 \times 10^{-9}$ |
| Comparative example | Not forming electroless plating layer | BNi | NG (No Good) | Over range |

According to the present invention, a fuel cell in which a cell coupling member and a fuel cell may be effectively brazed and a method of manufacturing the same may be provided.

In addition, a coupling force between a unit cell and a cell coupling member is increased to prevent inferior life span of the fuel cell.

Although the unit cell is hollow cylindrical throughout the embodiments, the unit cell is not limited thereto. The unit cell may be polygonal. Moreover, the cell coupling member made of metal has been described.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A fuel cell comprising:
a unit cell comprising a first electrode layer, an electrolyte layer surrounding an outer circumference of the first electrode layer, and a second electrode layer surrounding the electrolyte layer while exposing an end of the electrolyte layer;
a plating layer formed around an outer circumference of the exposed electrolyte layer;
a cell coupling member comprising a passage pipe configured to be inserted into the unit cell and to form a continuous passage from an inside of the unit cell, a coupling pipe provided outside of the passage pipe to form a space configured to accommodate an end of the unit cell from the passage pipe, and a connecting unit configured to connect the coupling pipe with the passage pipe and restrict an insertion depth of the electrolyte layer and the first electrode layer; and a welding portion comprising filler metal and configured to fix and seal the plating layer and an inner circumference of the coupling pipe with each other, wherein the plating layer is a separate layer from the welding portion.

2. The fuel cell as claimed in claim 1, wherein the plating layer is a electroless plated layer.

3. The fuel cell as claimed in claim 1, wherein the plating layer comprises nickel (Ni).

4. A fuel cell comprising:

a unit cell comprising a first electrode layer, an electrolyte layer surrounding an outer circumference of the first electrode layer, and a second electrode layer surrounding the electrolyte layer while exposing an end of the electrolyte layer;

a plating layer formed around an outer circumference of the exposed electrolyte layer;

a cell coupling member comprising a passage pipe configured to be inserted into the unit cell and to form a continuous passage from an inside of the unit cell, a coupling pipe provided outside of the passage pipe to form a space configured to accommodate an end of the unit cell from the passage pipe, and a connecting unit configured to connect the coupling pipe with the passage pipe and restrict an insertion depth of the layer and the first electrode layer; and a welding portion configured to fix and seal the plating layer and an inner circumference of the coupling pipe with each other, wherein the plating layer comprises nickel (Ni), and wherein the plating layer further comprises phosphorus (P) and/or boron (B).

5. The fuel cell as claimed in claim 4, wherein the plating layer comprises an amount of phosphorus (P) at 5 wt % or 10 wt % or between 5 wt % and 10 wt % with respect to total weight of the plating layer.

6. The fuel cell as claimed in claim 4, wherein the plating layer comprises an amount of boron (B) greater than 0 wt % and equal to or less than 5 wt % with respect to total weight of the plating layer.

7. The fuel cell as claimed in claim 1, wherein the plating layer extends over the end of the unit cell.

8. The fuel cell as claimed in claim 7, wherein the plating layer extends to an inner circumference of the unit cell.

9. The fuel cell as claimed in claim 8, further comprising an electrolyte layer between the unit cell and the plating layer.

10. A method of manufacturing a fuel cell, the method comprising:

manufacturing a unit cell comprising a first electrode layer, an electrolyte layer surrounding an outer circumference of the first electrode layer, and a second electrode layer surrounding the electrolyte layer while exposing an end of the electrolyte layer;

forming a plating layer on an outer circumference of the exposed electrolyte layer;

manufacturing a cell coupling member comprising a passage pipe configured to be inserted into the unit cell and to form a continuous passage from an inside of the unit cell, a coupling pipe provided outside of the passage pipe to form a space configured to accommodate an end of the unit cell from the passage pipe, and a connecting unit configured to connect the coupling pipe with the passage pipe and restrict an insertion depth of the electrolyte layer and the first electrode layer; and forming a welding portion comprising filler metal and configured to fix and seal the plating layer and an inner circumference of the coupling pipe with each other, wherein the plating layer is a separate layer from the welding portion.

11. The method as claimed in claim 10, wherein the plating layer is formed by electroless plating.

12. The method as claimed in claim 10, further comprising forming a plating seed layer on the outer circumference of the exposed electrolyte layer, before forming the plating layer.

13. The method as claimed in claim 12, wherein the plating seed layer is formed by immersion plating.

14. The method as claimed in claim 10, wherein the plating layer comprises nickel (Ni).

15. The method as claimed in claim 14, wherein the plating layer further comprises phosphorus (P) and/or boron (B).

16. The method as claimed in claim 15, wherein the plating layer comprises an amount of phosphorus (P) at 5 wt % or 10 wt % or between 5 wt % and 10 wt % with respect to total weight of the plating layer.

17. The method as claimed in claim 15, wherein the plating layer contains an amount of boron (B) greater than 0 wt % and equal to or less than 5 wt % with respect to total weight of the plating layer.

18. The method as claimed in claim 10, wherein the plating layer extends over the end of the unit cell.

19. The method as claimed in claim 18, wherein the plating layer extends to an inner circumference of the unit cell.

20. The method as claimed in claim 19, further comprising an electrolyte layer between the unit cell and the plating layer.

* * * * *